3,269,966
COATING COMPOSITION
Karl Brack, Wilmington, Del., assignor to Hercules Powder Company, Wilmington, Del., a corporation of Delaware
No Drawing. Filed Mar. 28, 1963, Ser. No. 268,559
The portion of the term of the patent subsequent to May 18, 1982, has been disclaimed
8 Claims. (Cl. 260—21)

This application is a continuation-in-part of my copending application Serial No. 141,020, filed September 27, 1961, now U.S. Patent 3,184,439.

This invention relates to protective coating compositions. More particularly, the invention relates to protective coating compositions comprising a mixture of a linear polymeric ester and a formaldehyde resin.

Formaldehyde resin, e.g., melamine-formaldehyde and urea-formaldehyde resins, and their use in protective coatings, are known in the art. However, the compositions of the prior art have been sensitive to moisture and inflexible.

It has now been discovered that protective coating compositions can be prepared by mixing certain linear polymeric esters with a formaldehyde resin to produce coatings which are flexible and less moisture sensitive.

Accordingly, the present invention relates to protective coating compositions comprising a mixture of from about 10% to about 80% of a linear polymeric ester having the general formula:

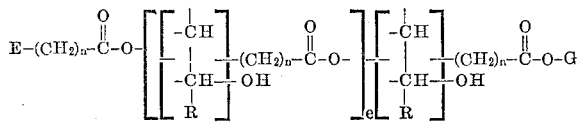

in which R is a substituent of the group consisting of hydrogen and alkyl radicals; $n$ is a whole number from 0 to 20, inclusive; $e$ is at least 1; G is a substituent of the group consisting of hydrogen, hydroxyalkyl radicals and halohydroxyalkyl radicals; and E is a substituent of the group consisting of

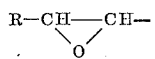

radicals,

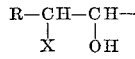

radicals and

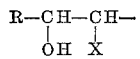

radicals, in which R has the same significance as set forth above, X is a substituent of the group consisting of hydrogen, halogen and —OH, and from about 90% to about 20% of a formaldehyde resin selected from the group consisting of melamine-formaldehyde resins, urea-formaldehyde resins, melamine-urea-formaldehyde resins and urea-thiourea-formaldehyde resins.

The polymeric esters employed in accordance with the instant invention are linear polyesters having a plurality of OH substituent groups attached at regular intervals along the polymer chain and which may or may not be terminated with hydroxyalkyl or hydroxyhaloalkyl end groups. The preparation of the linear polymeric esters and end termination is fully described in my copending parent application, Serial No. 141,020, filed September 27, 1961, now U.S. Patent 3,184,439. As stated therein, the polymeric esters are prepared by heating either an epoxidized aliphatic acid or a hydroxyhalo aliphatic acid or mixture thereof with or without a basic catalyst. Those polymeric esters prepared from epoxidized aliphatic acids such as 9,10-epoxystearic acid, 10,11-epoxyundecanoic acid, etc., are most preferred. If end termination is desired, a chain terminator (epihalohydrin or alkylene oxide) can be added during, preferably near the end of, the polymerization.

The polymeric esters can, if desired, be blended with one or more polyols before reaction with the formaldehyde resin to change the physical properties of the coating, e.g., hardness, resistance to heat, resistance to chemicals, aging characteristics, etc. The only limitation on such blends is that they contain an amount of linear polymeric esters sufficient to yield a polyol-formaldehyde resin mixture containing at least 10% by weight of polymeric ester. Exemplary of the polyols which can be used in such blends are: triisopropanolamine, poly(propylene oxide), polyester polyols [N,N,N',N'-tetrakis(2-hydroxypropyl)], ethylene diamine, propylene oxide adducts of sorbitol in which the sorbitol to propylene oxide molar ratio is from 1:6 to 1:24, propylene oxide adducts of trimethylolpropane in which the trimethylolpropane to propylene oxide molar ratio is from 1:3 to 1:36, propylene oxide adducts of pentaerythritol in which the pentaerythritol to propylene oxide molar ratio is from 1:4 to 1:8, etc.

Any of the conventional formaldehyde resins described above can be used in the coating compositions of this invention. The preparation of such resins is well known in the art and appears in standard texts on coating compositions. Normally the resin will be used in the form of about a 50% solution in an organic solvent. However, solutions of from about 20% to about 90% by weight can be used. Typical of the organic solvents used in the preparation of such solutions are ethanol, isopropanol, n-butanol, octanol, toluene, xylene, mineral spirits, methyl isobutyl ketone, etc. The most preferred solvent is n-butanol or a mixture of n-butanol with one of the other solvents.

The linear polymeric esters can be mixed with the resin solutions by any desired method. Generally, the polymeric ester will merely be dissolved in the resin solution.

The coating compositions can be cured to hard, clear coatings by the application of heat in the presence of an acid catalyst. The temperature for curing will generally be in the range of from about 80° C. to about 200° C. for a period of time of from about 2 minutes to about 1 hour. The amount of catalyst added will generally be from about 0.1% to about 10.0% based on total solids. Exemplary of the acid catalysts which can be used are n-butanol acid phosphate, phosphoric acid, oxalic acid, phthalic acid, etc.

The compositions of this invention can and often do contain other ingredients such as drying agents, stabilizers, antioxidants, dyes, pigments, plasticizers, etc., but the presence or absence of such ingredients is immaterial to the invention. These compositions can be used in all areas common to coating compositions and can be applied in any of the usual ways, i.e., brushing, rolling, dipping, spraying, etc.

The following examples are presented for purposes of illustration, parts and percentages being by weight unless otherwise specified.

*Example 1*

This example demonstrates the preparation and application of a coating composition prepared from an end-terminated polymeric ester and a melamine-formaldehyde resin.

To 133.3 parts of a 50% solids solution of butylated melamine-formaldehyde resin having a ratio of melamine to formaldehyde of approximately 1:4 in an 80:20 mixture of butanol to xylene was added 100 parts of an epichlorohydrin-terminated poly(9,10-epoxystearic acid) having an equivalent weight of 253.4 and an acid number of 1.9. After the polymeric ester had dissolved, 8.3 parts of n-butanol acid phosphate catalyst was added with vigorous agitation. From the resulting solution, films were cast on plate glass and bonderized steel substrates (steel treated with an aqueous zinc phosphate solution) using an 0.008-inch casting knife and then heat-cured for one hour at a temperature of 150° C. The Sward hardness of the resulting films both on glass and steel was 17 at a thickness of 0.5 mil. A sample of the film on the plate glass was removed and tested to determine its physical properties. It was found to have a tensile strength of 1300 p.s.i., an elongation of 3%, and a tensile modulus of 100,000 p.s.i.

*Example 2*

This example demonstrates the preparation and application of a coating composition prepared from a nonterminated polymeric ester and a melamine-formaldehyde resin To 200 parts of the 50% solids solution of melamine-formaldehyde resin described in Example 1 was added 100 parts of nonterminated poly(9,10-epoxystearic acid) having an equivalent weight of 300 and an acid number of 54. After the polymeric ester dissolved, 8.4 parts of n-butanol acid phosphate was added with agitation. From the resulting solution, films were cast on plate glass and bonderized steel substrates using an 0.008-inch casting knife and then heat-cured one hour at a temperature of 150° C. The Sward hardness of the resulting films was 10 at a thickness of 3.3 mils. A sample of the film on the plate glass was removed and tested to determine its physical properties. It was found to have a tensile strength of 800 p.s.i., an elongation of 9%, and a tensile modulus of 18,000 p.s.i. The sample of the film on the bonderized steel was exposed for three months in an indoor weathering machine equipped with light source to simulate sunshine, spraying facilities to simulate rain, as well as temperature and humidity controls. At the end of this period, the film was continuous and had not changed color. The Sward hardness of the film after the exposure had increased to 30.

*Example 3*

This example demonstrates the preparation and application of a coating composition prepared from a nonterminated polymeric ester and a urea-formaldehyde resin.

To 1348 parts of a 60% solids solution of a urea-formaldehyde resin in a 60:40 mixture of butanol to xylene was added 100 parts of the nonterminated poly(9,10-epoxystearic acid) described in Example 2. After the polymeric ester dissolved, 7 parts of phosphoric acid was added with agitation. From the resulting solution, films were cast on plate glass and bonderized steel substrates using a 0.008-inch casting knife and then were heat-cured for one hour at a temperature of 150° C. The Sward hardness of the resulting films ranged from 6–20 at film thicknesses of 2–4.3 mils. A sample of the film on the plate glass was removed and tested to determine its physical properties. It was found to have a tensile strength of 230 p.s.i., an elongation of 55%, and a tensile modulus of 3300 p.s.i. The sample of film on the bonderized steel was exposed for three months in the weather machine described in Example 2. At the end of this period, the film was continuous, glossy, and had not changed color. The Sward hardness of the film after the exposure had increased to 24.

*Example 4*

This example demonstrates the preparation and application of a coating composition prepared from a propylene oxide-terminated polyester and a melamine-formaldehyde resin.

To 100 parts of a propylene oxide-terminated poly (9,10-epoxystearic acid) having an acid number of 0.5, an ester number of 195.9, and a hydroxyl number of 187.4 was added 135 parts of the 50% solids solution of melamine-formaldehyde resin described in Example 1. After the polyester dissolved, 8 parts of n-butanol acid phosphate was added with agitation. From the resulting solution a film was cast on plate glass using a 0.03-inch casting knife. The film was heat-cured for one hour at a temperature of 150° C. The resulting film had a Sward hardness of 11 at a film thickness of 1 mil and was insoluble in n-butanol.

*Example 5*

This example demonstrates the preparation and application of a coating composition prepared from a nonterminated polymeric ester and a melamine-formaldehyde resin.

To 100 parts of a poly(10,11-epoxyundecanoic acid) having an acid number of 64, an ester number of 220, a hydroxyl number of 235, and a molecular weight of 880 was added 100 parts of n-butanol. The mixture was heated with agitation until a homogeneous solution was obtained. Then 200 parts of the 50% solids solution of melamine-formaldehyde resin described in Example 1 and 3 parts of 85% phosphoric acid were added with agitation. From the resulting solution a film was cast on plate glass using a 0.03-inch casting knife. The film was heat-cured for one hour at a temperature of 150° C. The resulting film had a Sward hardness of 23 at a film thickness of 1 mil and was insoluble in butanol.

*Example 6*

This example demonstrates the preparation and application of a coating composition prepared from an epichlorohydrin-terminated polymeric ester and a melamine-formaldehyde resin.

To 100 parts of an epichlorohydrin-terminated poly (10,11-epoxyundecanoic acid) having an acid number of 0, an ester number of 250, a hydroxyl number of 255 and a molecular weight of 898 was added 100 parts of n-butanol. The mixture was heated and agitated until a homogeneous solution was formed. Then 200 parts of the 50% solids solution of melamine-formaldehyde resin described in Example 1 and 3 parts of 85% phosphoric acid were added with agitation. From the resulting solution a film was cast on plate glass using a 0.03-inch casting knife. The film was heat-cured for one hour at a temperature of 150° C. The resulting film was hard, clear, insoluble in toluene, n-butanol, and methyl isobutyl ketone and had a Sward hardness of 18 at a film thickness of 2 mils.

What I claim and desire to protect by Letters Patent is:

1. A protective coating composition comprising a mixture of from about 10% to about 80% of a linear polymeric ester having a general formula:

$$E-(CH_2)_n-\overset{O}{\overset{\|}{C}}-O-\left[\begin{bmatrix} -\overset{|}{C}H \\ -\overset{|}{C}H-OH \\ R \end{bmatrix}-(CH_2)_n-\overset{O}{\overset{\|}{C}}-O-\right]_e \begin{bmatrix} -\overset{|}{C}H \\ -\overset{|}{C}H-OH \\ R \end{bmatrix}-(CH_2)_n-\overset{O}{\overset{\|}{C}}-O-G$$

in which R is a substituent of the group consisting of hydrogen and alkyl radicals; n is a whole number from 0 to 20, inclusive; e is at least 1; G is a substituent of the group consisting of hydrogen, hydroxyalkyl radicals and halohydroxyalkyl radicals; and E is a substituent of the group consisting of radicals;

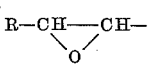

radicals, and

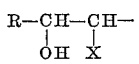

radicals, in which R has the same significance as set forth above, X is a substituent of the group consisting of hydrogen, halogen and —OH, and from about 90% to about 20% of a formaldehyde resin selected from the group consisting of melamine-formaldehyde and urea-formaldehyde resins.

2. A protective coating composition comprising a mixture of from 10% to about 80% of a linear polymeric ester having the general formula:

$$R-\underset{O}{\underset{\diagdown \diagup}{CH-CH}}-(CH_2)_n-\overset{O}{\overset{\|}{C}}-O-\left[\begin{array}{c}-\overset{|}{C}H-\\-\underset{R}{\overset{|}{C}H}-OH\end{array}(CH_2)_n-\overset{O}{\overset{\|}{C}}-O-\right]_e\left[\begin{array}{c}-\overset{|}{C}H-\\-\underset{R}{\overset{|}{C}H}-OH\end{array}\right](CH_2)_n-\overset{O}{\overset{\|}{C}}-O-G$$

in which R is a substituent of the group consisting of hydrogen and alkyl radicals; n is a whole number from 0 to 20, inclusive; e is at least 1; and G is a substituent of the group consisting of hydrogen, hydroxyalkyl radicals and halohydroxyalkyl radicals and from about 90% to about 20% of a formaldehyde resin selected from the group consisting of melamine-formaldehyde and urea-formaldehyde resins.

3. The composition of claim 2 wherein the polymeric ester is an epichlorohydrin-terminated poly(9,10-epoxystearic acid).

4. The composition of claim 2 wherein the polymeric ester is a poly(9,10-epoxystearic acid).

5. The composition of claim 2 wherein the polymeric ester is a propylene oxide-terminated poly(9,10-epoxystearic acid).

6. The composition of claim 2 wherein the polymeric ester is a poly(10,11-epoxyundecanoic acid).

7. The composition of claim 2 wherein the formaldehyde resin is a melamine-formaldehyde resin.

8. The composition of claim 2 wherein the formaldehyde resin is a urea-formaldehyde resin.

References Cited by the Examiner

UNITED STATES PATENTS

| | | | |
|---|---|---|---|
| 3,108,089 | 10/1963 | Ferstandig | 260—850 |
| 3,173,971 | 3/1965 | Roth et al. | 260—850 |
| 3,184,332 | 5/1965 | Rachinsky | 117—139.4 |
| 3,184,420 | 5/1965 | Brack | 260—2.5 |
| 3,184,439 | 5/1965 | Brack | 260—78.4 |

OTHER REFERENCES

Classification Order No. 363, United States Department of Commerce, Patent Office, August 28, 1964 (pages 15, 16, 17, 18, 19, and 21 relied on).

LEON J. BERCOVITZ, *Primary Examiner.*

F. McKELVEY, *Assistant Examiner.*

UNITED STATES PATENT OFFICE
CERTIFICATE OF CORRECTION

Patent No. 3,269,966            August 30, 1966

Karl Brack

It is hereby certified that error appears in the above numbered patent requiring correction and that the said Letters Patent should read as corrected below.

Column 5, line 18, for "of from 10% to about 80%" read -- of from about 10% to about 80% --; column 1, lines 30 to 35, and column 4, lines 64 to 68, the formula, each occurrence should appear as shown below instead of as in the patent:

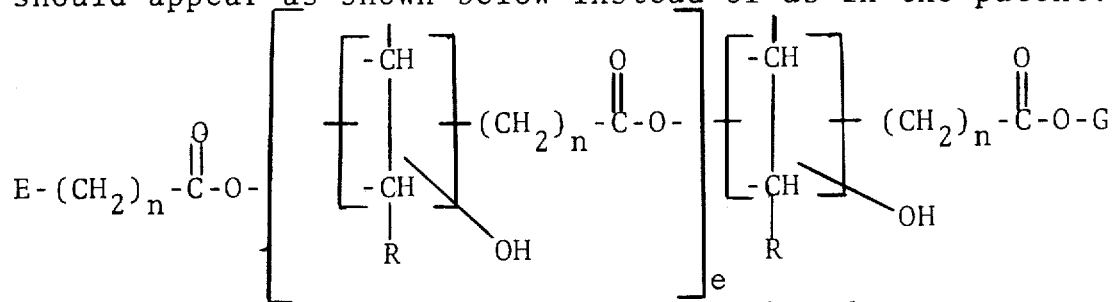

column 5, lines 24 to 30, the formula should appear as shown below instead of as in the patent:

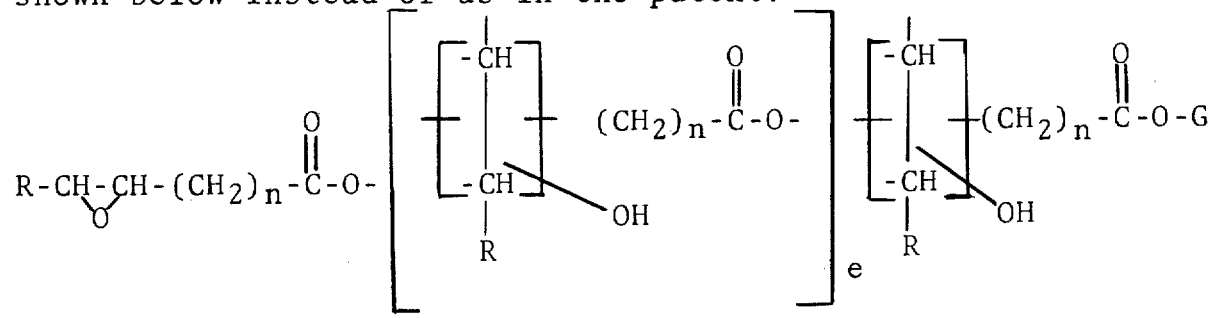

Signed and sealed this 5th day of September 1967.

(SEAL)
Attest:

ERNEST W. SWIDER            EDWARD J. BRENNER
Attesting Officer            Commissioner of Patents